US009031617B2

(12) United States Patent
Bengtsson et al.

(10) Patent No.: US 9,031,617 B2
(45) Date of Patent: *May 12, 2015

(54) RECEIVING USER INPUT ON A GRAPHICAL USER INTERFACE

(71) Applicant: Sony Mobile Communications AB, Lund (SE)

(72) Inventors: Henrik Bengtsson, Lund (SE); Sarandis Kalogeropoulos, Malmo (SE); Olivier Moliner, Lund (SE); Bjorn Rosqvist, Lund (SE); Martin Granstrom, Palo Alto, CA (US); Peter Aberg, Vinslov (SE)

(73) Assignee: Sony Mobile Communications AB, Lund (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/068,861

(22) Filed: Oct. 31, 2013

(65) Prior Publication Data

US 2014/0128125 A1    May 8, 2014

Related U.S. Application Data

(63) Continuation of application No. 13/488,686, filed on Jun. 5, 2012, now Pat. No. 8,600,450.

(60) Provisional application No. 61/581,044, filed on Dec. 28, 2011.

(51) Int. Cl.
*H04M 1/00*  (2006.01)
*H04M 1/38*  (2006.01)
(Continued)

(52) U.S. Cl.
CPC .............. *G06F 3/0488* (2013.01); *G06F 3/041* (2013.01); *G06F 3/0414* (2013.01);
(Continued)

(58) Field of Classification Search
CPC .............. G06F 3/016; G06F 2203/015; G06F 2203/014; G06F 3/03547; G06F 2203/04809
USPC ........ 455/566, 550.1, 575.1, 90.3, 90.1, 90.2, 455/158.2, 158.4, 154.2, 158.5, 159.1, 455/156.1, 157.2; 345/156, 163, 173, 177
See application file for complete search history.

(56) References Cited

U.S. PATENT DOCUMENTS

7,129,854 B2    10/2006  Arneson et al.
7,199,790 B2 *   4/2007  Rosenberg et al. ........... 345/175
(Continued)

FOREIGN PATENT DOCUMENTS

EP       1729315 A1    12/2006
WO    2010/091744       8/2010

OTHER PUBLICATIONS

"Touch Screen Technology Primer," ADmetro, pp. 1-4, Dec. 4, 2014.
(Continued)

*Primary Examiner* — Pablo Tran
(74) *Attorney, Agent, or Firm* — Renner, Otto, Boisselle & Sklar, LLP.

(57) ABSTRACT

A method for a device to receive a user input commanding the device to perform an action includes detecting a first amount of force exerted onto a graphical user interface, providing an indication that additional force must be exerted onto the graphical user interface to command the device to perform the action, detecting a second amount of force larger than the first amount of force exerted onto the graphical user interface, and providing a signal including data commanding performance of the action.

30 Claims, 11 Drawing Sheets

(51) Int. Cl.
*G06F 3/0488* (2013.01)
*G06F 3/041* (2006.01)
*G06F 3/044* (2006.01)
*H04M 1/02* (2006.01)
*H04M 1/725* (2006.01)

(52) U.S. Cl.
CPC .......... *G06F 3/0416* (2013.01); *G06F 3/044* (2013.01); *G06F 3/04883* (2013.01); *H04M 1/0266* (2013.01); *H04M 1/72519* (2013.01); *H04M 2250/22* (2013.01)

(56) References Cited

U.S. PATENT DOCUMENTS

| | | | |
|---|---|---|---|
| 7,236,157 B2 * | 6/2007 | Schena et al. | 345/161 |
| 7,432,911 B2 | 10/2008 | Skarine | |
| 7,433,719 B2 | 10/2008 | Dabov | |
| 7,511,702 B2 | 3/2009 | Hotelling | |
| 7,538,760 B2 | 5/2009 | Hotelling et al. | |
| 7,605,800 B2 * | 10/2009 | Rosenberg | 345/156 |
| 8,046,721 B2 | 10/2011 | Chaudhri et al. | |
| 8,068,605 B2 | 11/2011 | Holmberg | |
| 8,179,375 B2 * | 5/2012 | Ciesla et al. | 345/173 |
| 8,224,392 B2 | 7/2012 | Kim et al. | |
| 2005/0190159 A1 | 9/2005 | Skarine | |
| 2010/0138797 A1 | 6/2010 | Thorn | |
| 2010/0182270 A1 | 7/2010 | Caliskan et al. | |
| 2010/0201635 A1 | 8/2010 | Klinghult et al. | |
| 2010/0279738 A1 | 11/2010 | Kim et al. | |

OTHER PUBLICATIONS

"Peratech's new, see through QTC Clear™ will revolutionise touch screens," http://www.peratech.com/pr_qtcclear.php, Richmond, North Yorks., England, Apr. 5, 2011, p. 1-2.

Wilson et al., "GWindows: Robust Stereo Vision for Gesture-Based Control of Windows," Microsoft Research, One Microsoft Way, Redmond, WA, Nov. 5-7, 2003.

Schlegel et al., "AirTouch: Interacting with Computer Systems at a Distance," Dept. of Computer Science and Engineering, SUNY at Buffalo, pp. 1-8, Oct. 1, 2010.

U.S. Appl. No. 13/488,686, filed Jun. 5, 2012, Notice of Allowance dated Aug. 2, 2013.

* cited by examiner

RECEIVING USER INPUT ON A GRAPHICAL USER INTERFACE

RELATED APPLICATION DATA

The present application is a continuation of U.S. Non-Provisional patent application Ser No. 13/488,686 filed on Jun. 5, 2012, which claims the benefit of U.S. Provisional Application Ser. No. 61/581,044, filed Dec. 28, 2011, the disclosures of both applications are herein incorporated by reference in their entirety.

TECHNICAL FIELD OF THE INVENTION

The technology of the present disclosure relates generally to electronic devices and, more particularly, to electronic devices including a graphical user interface configured to receive a user input on the graphical user interface.

BACKGROUND

Touch screen graphical user interfaces are known in the art as input/output devices for controlling electronic devices. Traditionally, touch screen graphical user interfaces include touch sensors adapted to detect a touch position in two dimensions, x and y. Moreover, traditionally, touch screen graphical user interfaces include touch sensors based on capacitive sensing. These traditional user interfaces typically require the user to approach the screen with bare skin. The capacitive sensing user interfaces would not respond to being touched with gloves, for example. This may be a problem for, for example, operation in particularly cold temperatures. It may be uncomfortable for a user to have to remove her gloves to operate the user interface.

In addition, capacitive sensing user interfaces may not perform well in moist environments. This could present a dangerous situation. For example, a user may be involved in an accident or be in a dangerous situation during a rain or snow storm. The user may desire to dial an emergency number such as 911. However, a mobile device with a capacitive sensing user interface that has been exposed to moisture may not respond to the user's command. Ideally, the mobile device would respond to the user's command regardless of the weather conditions.

SUMMARY

Providing touch screen graphical user interfaces that are also capable of sensing force applied to the touch screen may help provide improved input devices capable of input detection in three dimensions, x, y and z. Electronic devices, particularly consumer products such as mobile telephones, mobile navigation systems, gaming devices, media players, and so on, may benefit from these improved input devices to be used in combination with more complex and advanced applications.

Providing touch screen graphical user interfaces capable of sensing force may help alleviate some of the above-mentioned concerns because force sensing user interfaces may be impervious or at least resistant to rain or snow in that moisture or cold temperature would not affect the touch screen graphical user interfaces capable of sensing force as much as they affect capacitive touch screen graphical user interfaces. This characteristic of force sensing user interfaces may also become important in other settings such as, for example, electronic devices in humid environments such as manufacturing environments, etc.

To facilitate user control of an electronic device via a graphical input interface, the present disclosure describes improved electronic devices, mobile telephones and methods for user input including user exertion of force onto a graphical user interface.

According to one aspect of the invention, a mobile telephone includes a graphical user interface configured to provide a graphical indication at a location on the graphical user interface. The graphical indication corresponds to an indication that at least one of touching the location or exerting a certain amount of force at the location corresponds to user input commanding the mobile telephone to answer an incoming telephone call.

The mobile telephone further includes a detection logic configured to detect a first amount of force exerted at substantially the location on the graphical user interface and further configured to produce a signal including data indicative of the first amount of force.

The mobile telephone further includes an indication logic configured to determine based on the signal including data indicative of the first amount of force that the first amount of force is insufficient to command the mobile telephone to answer the incoming telephone call and further configured to produce a signal including data indicating that additional force must be exerted to command the mobile telephone to answer the incoming telephone call.

The detection logic is further configured to detect a second amount of force larger than the first amount of force exerted on the graphical user interface and further configured to produce a signal including data indicative of the second amount of force.

The indication logic is further configured to determine based on the signal including data indicative of the second amount of force that the second amount of force is sufficient to command the mobile telephone to answer the incoming telephone call. The indication logic is further configured to produce a signal including data commanding the mobile telephone to answer the incoming telephone call.

In one embodiment, the graphical user interface is further configured to display a graphical indication corresponding to an indication that force additional to the first amount of force must be exerted on the graphical user interface to command the mobile telephone to answer the incoming telephone call. In one embodiment, the graphical indication includes at least one of a geometric figure that changes in correspondence to changes in force exerted onto the graphical user interface or a color that changes in correspondence to changes in force exerted onto the graphical user interface. In another embodiment, the geometric figure changing in correspondence to changes in force exerted onto the graphical user interface includes the geometric figure growing in at least one dimension in correspondence to additional force being exerted and shrinking it at least one dimension in correspondence to less force being exerted, and the color changing in correspondence to changes in force exerted onto the graphical user interface includes the color gradually changing to a second color in correspondence to additional force being exerted and gradually returning to the color in correspondence to less force being exerted.

In one embodiment, the mobile telephone includes a transducer configured to produce at least one of sound and vibration in response to at least one of the signal including data indicating that additional force must be exerted to command the mobile telephone to answer the incoming telephone call and a signal produced by the indication logic including data indicating the second amount of force to be sufficient to command the mobile telephone to answer the incoming telephone call. At least one of frequency and intensity of the at least one of the sound and the vibration changes in correspondence to changes in the force exerted onto the graphical user interface.

In one embodiment, the mobile telephone includes a touch detection logic configured to detect touch of a user's skin at substantially the location on the graphical user interface and further configured to produce a signal including data indicative of the detected touch. The indication logic is further configured to determine based on the signal including data indicative of the detected touch that the detected touch corresponds to a command the mobile telephone to answer the incoming telephone call.

In one embodiment, the mobile telephone includes a touch detection logic configured to detect touch of a user's skin at substantially the location on the graphical user interface and further configured to produce a signal including data indicative of the detected touch. The indication logic is configured to determine based on a combination of the signal including data indicative of the detected touch and the signal including data indicative of the first amount of force that the first amount of force is insufficient to command the mobile telephone to answer the incoming telephone call. The indication logic is configured to determine based on a combination of the signal including data indicative of the detected touch and the signal including data indicative of the second amount of force that the second amount of force is sufficient to command the mobile telephone to answer the incoming telephone call.

In one embodiment, the mobile telephone includes a touchless detection logic configured to detect a touchless user input corresponding to a selection of the location on the graphical user interface and further configured to produce a signal including data indicative of the touchless user input. The indication logic is configured to determine based on a combination of the signal including data indicative of the touchless user input and at least one of the signal including data indicative of the first amount of force and the signal including data indicative of the second amount of force that the combination is sufficient to command the mobile telephone to answer the incoming telephone call.

According to another aspect of the invention, a device comprises a graphical user interface configured to receive a user input by user exertion of force onto the graphical user interface, a force detection logic operatively connected to the graphical user interface and configured to produce a signal including data indicative of a first amount of force exerted at a location on the graphical user interface, and an indication logic operatively connected to the force detection logic and configured to determine based on the signal including data indicative of the first amount of force exerted at the location on the graphical user interface that the first amount of force is insufficient to command the device to perform an action based on the user input. The indication logic is further configured to produce a signal including data indicating that additional force must be exerted to command the device to perform the action. The force detection logic is further configured to produce a signal including data indicative of a second amount of force larger than the first amount of force exerted substantially at the location on the graphical user interface. The indication logic is further configured to determine based on the signal including data indicative of the second amount of force exerted at the location on the graphical user interface that the second amount of force is sufficient to command the device to perform the action based on the user input, wherein the indication logic is further configured to produce a signal including data commanding performance of the action.

In one embodiment, the indication logic is further configured to produce a signal including data indicating at least one of detection of the second amount of force, or the second amount of force to be sufficient to command the device to perform the action.

In one embodiment, the device includes a transducer operatively connected to the indication logic and configured to produce at least one of sound and vibration in response to at least one of the signal including data indicating that additional force must be exerted to command the device to perform the action and the signal including data indicating the second amount of force to be sufficient to command the device to perform the action. At least one of frequency and intensity of the at least one of the sound and the vibration changes in correspondence to changes in the force exerted onto the graphical user interface.

In one embodiment, the graphical user interface is further configured to provide a graphical indication at substantially the location on the graphical user interface. The graphical indication corresponds to an indication to the user that at least one of touching and exerting force at the location corresponds to user input commanding the device to perform the action.

In one embodiment, the graphical user interface is further configured to display a graphical indication in response to the signal including data indicating that additional force must be exerted to command the device to perform the action, wherein the graphical indication changes in correspondence to changes in force exerted onto the graphical user interface.

In one embodiment, the device includes a touch detection logic configured to detect touch of a user's skin at substantially the location on the graphical user interface and further configured to produce a signal including data indicative of the detected touch. The indication logic is further configured to determine based on the signal including data indicative of the detected touch that the detected touch is sufficient to command the device to perform the action.

In one embodiment, the device includes a touch detection logic configured to detect touch of a user's skin at substantially the location on the graphical user interface and further configured to produce a signal including data indicative of the detected touch. The indication logic is configured to determine based on a combination of the signal including data indicative of the detected touch and the signal including data indicative of the first amount of force that the first amount of force is insufficient to command the device to perform the action. The indication logic is configured to determine based on a combination of the signal including data indicative of the detected touch and the signal including data indicative of the second amount of force that the second amount of force is sufficient to command the device to perform the action.

In one embodiment, the device includes a touchless detection logic configured to detect a touchless user input corresponding to a selection of the location on the graphical user interface and further configured to produce a signal including data indicative of the touchless user input. The indication logic is configured to determine based on a combination of the signal including data indicative of the touchless user input and at least one of the signal including data indicative of the first amount of force and the signal including data indicative of the second amount of force that the combination is sufficient to command the device to perform the action.

According to another aspect of the invention, a method for a device including a touch screen user interface to receive a user input commanding the device to perform an action includes detecting a first amount of force exerted at a location on the touch screen user interface, providing an indication that the first amount of force has been detected and further providing an indication that additional force must be exerted to command the device to perform the action, detecting a second amount of force larger than the first amount of force exerted substantially at the location, and providing a signal including data commanding performance of the action.

In one embodiment, the method includes providing an indication that the second amount of force has been detected and further indicating the second amount of force to be sufficient to command the device to perform the action.

In one embodiment, at least one of the indication that the first amount of force has been detected, the indication that additional force must be exerted to command the device to perform the action, the indication that the second amount of force has been detected, and the indication indicating the second amount of force to be sufficient to command the device to perform the action includes at least one of a sound feedback, a haptic feedback, and a graphical feedback.

In one embodiment, the touch screen user interface includes a graphical user interface, and the method further includes providing a graphical indication at the location on the touch screen user interface that at least one of touching and exerting force at the location corresponds to the user input commanding the device to perform the action.

In one embodiment, the providing the indication that additional force must be exerted to command the device to perform the action includes changing a display on the touch screen user interface in correspondence with changes in the force exerted.

In one embodiment, the changing the display on the touch screen user interface includes at least one of increasing the size of a geometric figure in at least one dimension in correspondence with additional force being exerted and shrinking the size of the geometric figure in it at least one dimension in correspondence with less force being exerted, or changing a portion of the touch screen user interface gradually from a first color to a second color in correspondence to additional force being exerted and gradually returning to the first color in correspondence to less force being exerted.

In one embodiment, the providing the indication that additional force must be exerted to command the device to perform the action includes providing at least one of a sound signal and a vibration signal, wherein at least one of frequency and intensity of the at least one of the sound signal and the vibration signal changes as force exerted on the user interface changes.

In one embodiment, the method includes detecting touch of a user's skin at substantially the location on the touch screen user interface, and providing the signal including data commanding performance of the action based on the detecting touch of the user's skin at substantially the location on the touch screen user interface.

In one embodiment, the method includes detecting touch of a user's skin at substantially the location on the touch screen user interface, providing the indication that the first amount of force has been detected and the indication that additional force must be exerted to command the device to perform the action based on the detecting the touch of the user's skin at substantially the location on the touch screen user interface and on the detecting the first amount of force exerted at the location on the touch screen user interface, and providing the signal including data commanding performance of the action based on the detecting the touch of the user's skin at substantially the location on the touch screen user interface and the detecting the second amount of force larger than the first amount of force exerted substantially at the location.

In one embodiment, the method includes detecting a touchless user input corresponding to a selection of the location on the graphical user interface, and providing the signal including data commanding performance of the action based on a combination of the detecting the touchless user input corresponding to the selection of the location on the graphical user interface and at least one of the detecting the first amount of force exerted at the location on the touch screen user interface and the detecting the second amount of force larger than the first amount of force exerted substantially at the location.

According to another aspect of the invention, a device comprises a graphical user interface configured to receive a user input by user exertion of force onto the graphical user interface, a force detection logic operatively connected to the graphical user interface and configured to produce a signal including data indicative of an amount of force exerted at a location on the graphical user interface, a touchless detection logic configured to detect a touchless user input corresponding to selection of the location on the graphical user interface and further configured to produce a signal including data indicative of the touchless user input, and an indication logic operatively connected to the force detection logic and the touchless detection logic. The indication logic is configured to command the performance of an action based on the signal including data indicative of the amount of force exerted and the signal including data indicative of the touchless user input that.

In one embodiment, the indication logic is configured to command the performance of the action if the signal including data indicative of the amount of force exerted indicates that an amount of force larger than a threshold has been exerted at the location on the graphical user interface and the signal including data indicative of the touchless user input indicates that the location on the graphical user interface has been selected.

In one embodiment, the indication logic is configured to take no action if the signal including data indicative of the touchless user input indicates that the location on the graphical user interface has been selected but the signal including data indicative of the amount of force exerted indicates that an amount of force larger than a threshold has not been exerted at the location on the graphical user interface.

In one embodiment, the indication logic is configured to produce a signal indicative of hovering if the signal including data indicative of the touchless user input indicates that the location on the graphical user interface has been selected but the signal including data indicative of the amount of force exerted indicates that an amount of force larger than a threshold has not been exerted at the location on the graphical user interface.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

DETAILED DESCRIPTION OF EMBODIMENTS

Figure 1:
FIG. 1 illustrates an example mobile phone.

Embodiments will now be described with reference to the drawings, wherein like reference numerals are used to refer to like elements throughout. It will be understood that the figures are not necessarily to scale.

In the present disclosure, embodiments are described primarily in the context of a mobile telephone. It will be appreciated, however, that the exemplary context of a mobile telephone is not the only operational environment in which aspects of the disclosed systems and methods may be used. Therefore, the techniques described in this disclosure may be applied to any type of appropriate electronic device, examples of which include a mobile telephone, a media player, a gaming device, a computer, a television, a video monitor, a multimedia player, a DVD player, a Blu-Ray player, a pager, a communicator, an electronic organizer, a personal digital assistant (PDA), a smartphone, a portable communication apparatus, etc.

FIG. 1 illustrates an example mobile phone 100. The phone 100 is illustrated as having a "brick" or "block" form factor housing, but it will be appreciated that other housing types may be utilized, such as a "flip-open" form factor (e.g., a "clamshell" housing) or a slide-type form factor (e.g., a "slider" housing).

The phone 100 includes a graphical user interface (GUI) 110. The GUI 110 displays information to a user, such as operating state, time, telephone numbers, contact information, various menus, etc., that enable the user to utilize the various features of the phone 100. The GUI 110 may also be used to visually display content received by the phone 100 or content retrieved from memory of the phone 100. The GUI 110 may be used to present images, video, and other graphics to the user, such as photographs, mobile television content, and video associated with games.

The phone 100 further includes a keypad 120 that provides for a variety of user input operations. Although, three keys are illustrated in the keypad 120, the keypad 120 may include more or fewer than three keys. For example, the keypad 120 may include alphanumeric keys for allowing entry of alphanumeric information such as telephone numbers, phone lists, contact information, notes, text, etc. In addition, the keypad 120 may include special function keys such as a "call send" key for initiating or answering a call and a "call end" key for ending or "hanging up" a call. Special function keys also may include menu navigation keys, for example, to facilitate navigating through a menu displayed on the GUI 110. For instance, a pointing device or navigation key may be present to accept directional inputs from a user or a select key may be present to accept user selections. Other keys (not shown) associated with the phone 100 may include a volume key, an audio mute key, an on/off power key, a web browser launch key, etc. In some embodiments, the GUI 110 may incorporate the keypad 120 in the sense that any keys in the keypad 120 may be virtual keys that a user may press by interacting with the GUI 110. Also, the GUI 110 and keypad 120 may be used in conjunction with one another to implement soft key functionality.

In one embodiment, the GUI 110 is a touch screen graphical user interface that is force sensing; the GUI 110 receives user input by user exertion of force onto the GUI 110. Such force sensing touch screen graphical user interface may be implemented by using techniques for graphical user interfaces capable of receiving user input by user exertion of force such as is further described below. Examples of force sensing touch screen graphical user interfaces include the sensor and methods described in U.S. patent application Ser. No. 12/368, 462 assigned to the assignee of the present disclosure and hereby incorporated by reference in its entirety. Such force sensing touch screen graphical user interface 110 may also be implemented by using other techniques for graphical user interfaces capable of receiving user input by user exertion of force.

In another embodiment, the GUI 110 is a force sensing touch screen graphical user interface that receives user input by user exertion of force onto the GUI 110 in addition to receiving user input by capacitive sensing. Such capacitive sensing user interface involves the detecting of touch of a user's skin on the screen of the GUI 110 and use known capacitive sensing human interface device (HID) technology. In yet another embodiment, the GUI 110 includes or is associated with a touchless interface that receives user input by touchless sensing, which does not require the user to touch the screen of the GUI 110. Although the touchless interface does not require the user to touch the screen of the GUI 110 to receive user input, the user may touch the screen of the GUI 110 and the touchless interface would receive the user input. Various technologies exist that provide touchless sensing including technologies such as Ubiq'window by LM3LABS Corporation (http://www.lm3labs.com), GWindows by Microsoft Corporation, and AirTouch, a computer interaction system developed at the State University of New York (SUNY) at Buffalo (Schlegel et al., AirTouch: Interacting With Computer Systems At A Distance, at http://www.cse.buffalo.edu/~jcorso/pubs/wacv2011_airtouch.pdf).

In the illustrated embodiment, the phone 100 is illustrated as receiving an incoming telephone call. In this embodiment, the GUI 110 displays the term "Incoming Call" to alert a user of the incoming telephone call. In addition, the GUI 110 may display the name, contact information, and even a picture of the person calling. The GUI 110 further displays an "Answer" location 130 and a "Decline" location 140 that the user of the phone 100 may use to answer or decline the incoming call, respectively. The "Answer" location 130, for example, is a graphical indication to the user that touching or exerting force onto the "Answer" location 130 corresponds to user input commanding the phone 100 to answer the incoming telephone call.

In one embodiment, the user of the phone 100 may answer the incoming telephone call by exerting a certain amount of force onto the "Answer" location 130. In this embodiment, circuitry in the phone 100 interprets the certain amount of force exerted onto the "Answer" location 130 as an indication that the user wishes to answer the incoming telephone call. Similarly, the user of the phone 100 may decline to answer the incoming telephone call by exerting a certain amount of force onto the "Decline" location 140. In another embodiment, the user may answer or may decline the incoming telephone call by simply touching the "Answer" location 130 or the "Decline" location 140, respectively. In this embodiment, circuitry in the phone 100 interprets the touch of the "Answer" location 130 as an indication that the user wishes to answer or decline the incoming telephone call. A similar mechanism may be used for disconnecting or hanging up an established telephone call.

In one embodiment, the phone 100 is equipped with force sensing and capacitive sensing capabilities and may determine whether to receive user input by force sensing or by touch sensing. For example, if the user touches the screen of the GUI 110 while wearing gloves, force sensing would detect the exerted force on the GUI 110, but capacitive sensing would not detect the touch of the GUI 110 by the user's skin because the user's skin is covered by the glove. In this example, circuitry in the phone 100 determines that user input is to be received by user exertion of force only. In another example, if the user touches the screen of the GUI 110 with her bare hands, force sensing would detect the exerted force on the GUI 110 and capacitive sensing would detect the touch of the GUI 110 by the user's skin because the user's skin is not covered. In this example, circuitry in the phone 100 determines that user input is to be received by capacitive sensing only or by the combination of capacitive sensing and force sensing. Thus, in this embodiment, force at a location on the GUI 110 detected by force sensing or touch of the user's skin at the location on the GUI 110 detected by capacitive sensing may be received by the phone 100 as user input. Therefore, the phone 100 receives user input via a method (force sensing, capacitive sensing, or combinations thereof) that is customized for the user's condition (e.g., glove or no glove).

In another embodiment, the phone 100 is equipped with both force sensing and capacitive sensing capabilities and is configured to receive user input only by the combination of capacitive sensing and force sensing. Force at a location on the GUI 110 detected by force sensing accompanied by a touch of the user's skin at the same location on the GUI 110 detected by capacitive sensing is received by the phone 100 as user input. Force at a location on the GUI 110 detected by force sensing by itself, without being accompanied by a touch of the user's skin at the same location on the GUI 110 detected by capacitive sensing, is not received by the phone 100 as user input. For example, if something other than the user's skin exerts force onto the screen of the GUI 110, the phone 100 disregards the input detected by force sensing alone. This feature may help alleviate some issues of false user input such as unintentional dialing (e.g., pocket dialing) and unintentional disconnecting of a telephone call.

In yet another embodiment, the phone 100 is equipped with force sensing and touchless sensing capabilities and is configured to receive user input by the combination of touchless sensing and force sensing. Force at a location on the GUI 110 detected by force sensing accompanied by a touchless input detected by touchless sensing at the same location on the GUI 110 is received by the phone 100 as user input. Force at a location on the GUI 110 detected by force sensing by itself, without being accompanied by a touchless input at the same location on the GUI 110 detected by touchless sensing, is not received by the phone 100 as user input. For example, if exerted force onto the screen of the GUI 110 is detected without input detected by touchless sensing at the location on the GUI 110, the phone 100 may disregard the force detected by force sensing alone. In addition, a known false user input problem with touchless sensing is that input may be received from a touchless interface when the user did not mean to enter the user input but was merely "hovering" over the location on the screen of the GUI 110. In this embodiment, if input at the location on the GUI 110 is detected by touchless sensing but no force exerted at the location is detected by force sensing, the phone 100 may disregard the touchless input detected by touchless sensing alone as "hovering." Therefore, the phone 100 may receive user input via a method that may help reduce instances of false user input.

Figure 2:
FIG. 2 illustrates the example mobile phone with a dot corresponding to the touch of the phone user's finger on the "Answer" location.

FIG. 2 illustrates the mobile phone 100 with a dot 150 corresponding to the touch of the finger of the user of the phone 100 on the "Answer" location 130. In the illustrated embodiment, the user seeks to answer the incoming call and therefore uses her finger to touch or exert some force onto the "Answer" location 130.

Figures 3A, 3B:
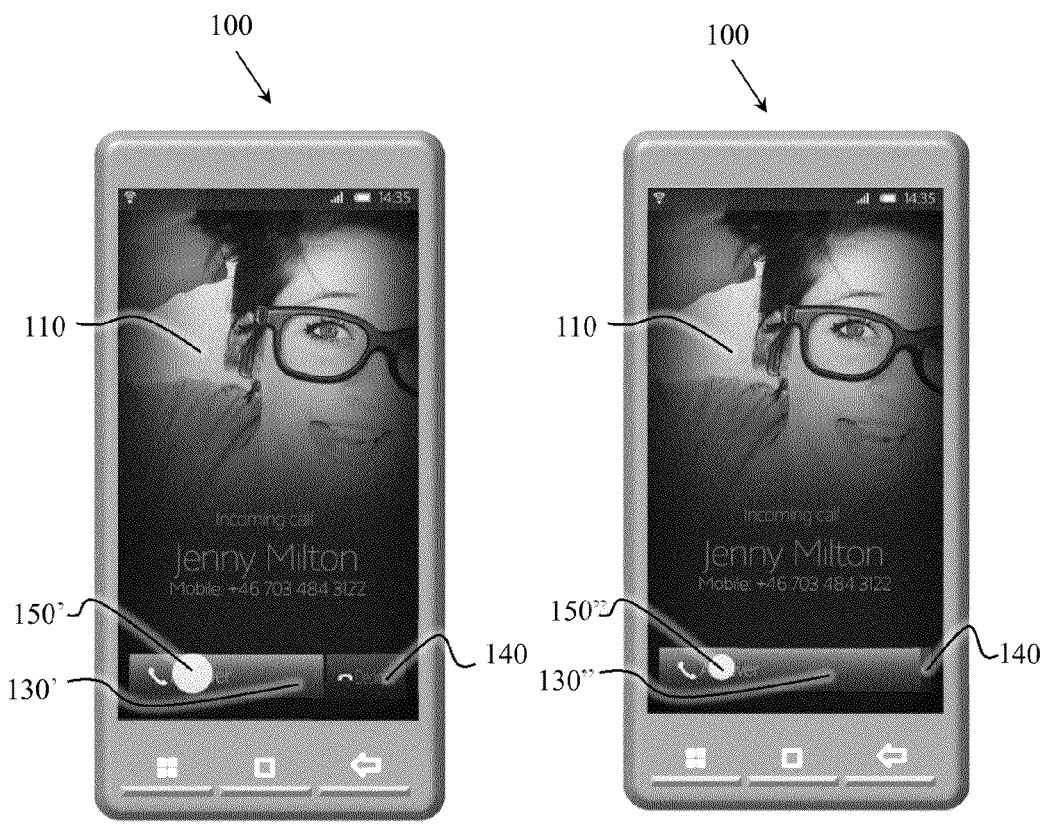
FIGS. 3A and 3B illustrate the mobile phone with the dot corresponding to the touch of the phone user's finger on enlarged "Answer" locations.

FIGS. 3A and 3B illustrate an embodiment of the mobile phone 100 that includes force sensing by itself or in addition to capacitive sensing and/or touchless sensing. The mobile phone 100 is shown with reduced size dots 150' and 150" corresponding to the touch of the finger of the user of the phone 100 on enlarged "Answer" locations 130' and 130". In FIG. 3A, the phone 100 detects the first amount of force exerted by the user's finger at the "Answer" location 130 and provides visual feedback to the user via the GUI 110 that the force has been detected by reducing the size of the dot 150 (FIG. 2) to look like the reduced size dot 150' (FIG. 3A) and by enlarging the "Answer" location 130 (FIG. 2) to look like the enlarged "Answer" location 130' (FIG. 3A). Similarly, in FIG. 3B, the phone 100 detects an additional or larger amount of force exerted by the user's finger at the "Answer" location 130' and provides visual feedback to the user via the GUI 110 that the larger force has been detected by further reducing the size of the dot 150' (FIG. 3A) to look like the reduced dot 150" (FIG. 3B) and by enlarging the "Answer" location 130' (FIG. 3A) to look like the enlarged "Answer" locations 130" (FIG. 3B). As the force exerted by the user increases the size of the "Answer" location 130 also increases and the size of the dot 150 decreases. Eventually, as the user exerts sufficient force onto the GUI 110, the phone 100 answers the incoming call.

In the embodiment of FIGS. 3A and 3B, the phone 100 requires a minimum amount of force to be exerted onto the "Answer" location 130 (i.e., a threshold) for circuitry in the phone 100 to determine that the user seeks to command the phone 100 to answer the incoming call. In one embodiment, the threshold is three newtons. In other embodiments, the threshold corresponds to a force other than three newtons. Since the amount of force applied by a user is proportional to the output of the GUI 110, the phone 100 may detect the first amount of force exerted by the user's finger at the "Answer" location 130 and determines whether the first amount of force is sufficient (i.e., whether the first amount of force is equal or larger than the minimum amount of force or threshold required for the phone 100 to make the determination that the user seeks to command the phone 100 to answer the incoming call).

If the phone 100 determines that the first amount of force exerted by the user is insufficient (i.e., lower than the threshold required for the phone 100 to answer the incoming telephone call), as shown in FIGS. 3A and 3B, the phone 100 indicates to the user via the GUI 110 that force additional to the first amount of force must be exerted on the GUI 110 to command the phone 100 to answer the incoming telephone call. Thus, the enlarged "Answer" location 130' and the reduced dot 150', in addition to serving as visual feedback that the first amount force has been detected, serve as visual feedback that a force larger than the first amount of force must be exerted on the GUI 110 to command the phone 100 to answer the incoming telephone call. Similarly, the further enlarged "Answer" location 130" and the further reduced dot 150", in addition to serving as visual feedback that the additional force has been detected, serve as visual feedback that even more force must be exerted on the GUI 110 to command the phone 100 to answer the incoming telephone call. If circuitry in the phone 100 determines that an amount of force exerted by the user is sufficient (i.e., equal to or larger than the threshold required for the phone 100 to answer the incoming telephone call), the circuitry commands the phone 100 to answer the telephone call.

In one embodiment (not shown), the phone 100 produces auditory feedback instead of visual feedback. In this embodiment, the phone 100 may include a transducer that produces a sound (e.g., a speaker). In one embodiment, the auditory feedback includes changing frequency or intensity of the sound as the force exerted on the GUI 110 increases or decreases. In another embodiment, the phone 100 produces tactile (e.g., haptic) feedback instead of visual or auditory feedback. In this embodiment, the phone 100 may include a transducer that produces vibration (e.g., a vibrator). In one embodiment, the tactile feedback includes changing frequency or intensity of the vibration as the force exerted on the GUI 110 increases or decreases. In yet another embodiment, the phone 100 includes a transducer that provides a feedback by a mechanism other than visual, auditory, or tactile feedback that changes as the force exerted on the GUI 110 increases or decreases. In one embodiment, the phone 100 includes a combination of visual, auditory, tactile, or other forms of feedback to indicate to the user that force has been detected and/or that additional force is required.

The above description regarding use of a touch screen graphical user interface that receives user input by user exertion of force for answering an incoming call is only exemplary and a similar graphical user interface may be used to perform other actions or functions on the phone 100 (e.g., placing an outgoing telephone call, ending a telephone call, etc.) or any other device including a graphical or touch screen user interface.

Figure 4:
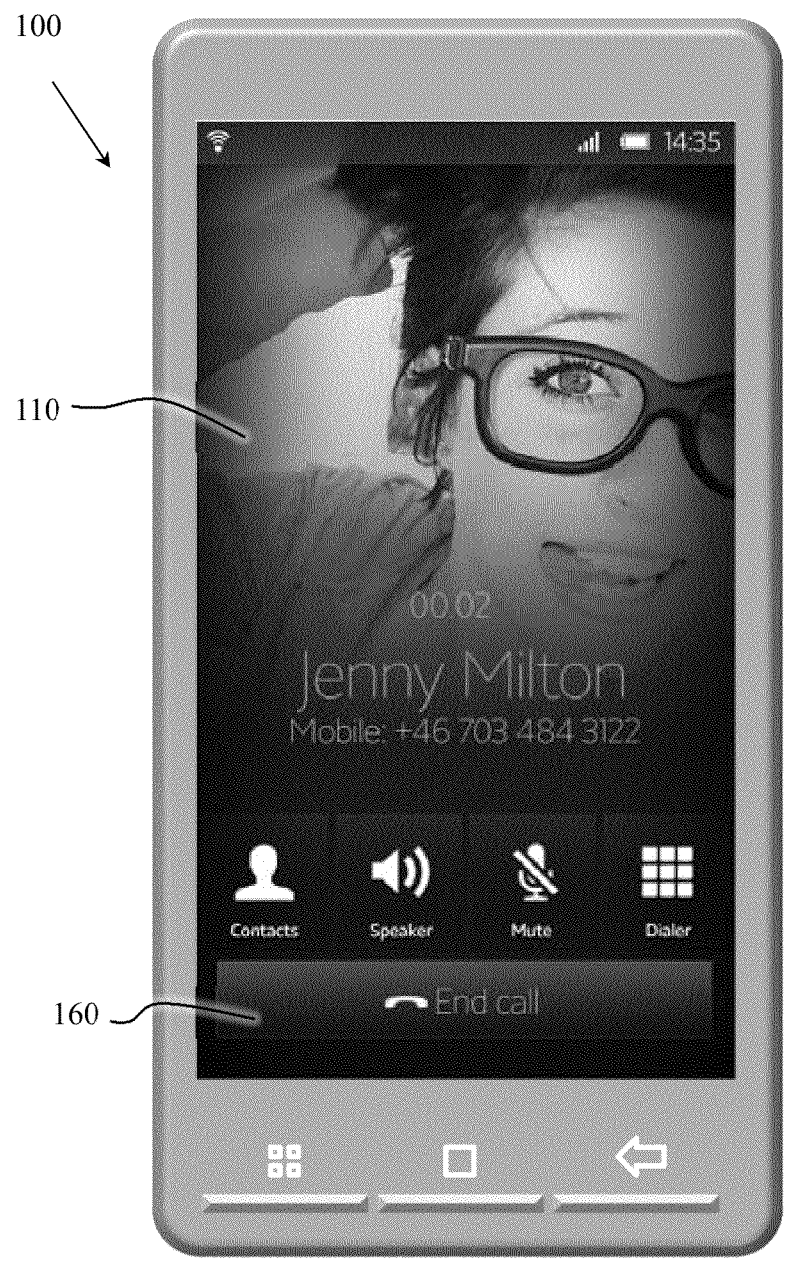
FIG. 4 illustrates the mobile phone after an incoming call has been answered.

For example, FIG. 4 illustrates the mobile phone 100 after the incoming call has been answered. The user pressed the "Answer" location 130 with sufficient force to command the phone 100 to answer the incoming call. After the call has been answered, the phone 100 displays via the GUI 110 an "End Call" location 160. To end the current call, the phone 100 may require the user to exert a minimum amount of force onto the "End Call" location 160. The phone 100 may detect force exerted by the user's finger at the "End Call" location 160 and determine whether the force is sufficient to end the call. An enlarged "End Call" location (not shown, but for example, similar to the above described "Answer" location 130) may serve as visual feedback (or sound, or vibration, or some other mechanism as described above may serve as auditory, tactile, or some other form of feedback) that force has been detected and, where applicable, as feedback that additional force must be exerted on the GUI 110 to command the phone 100 to end the telephone call.

Figure 5A:
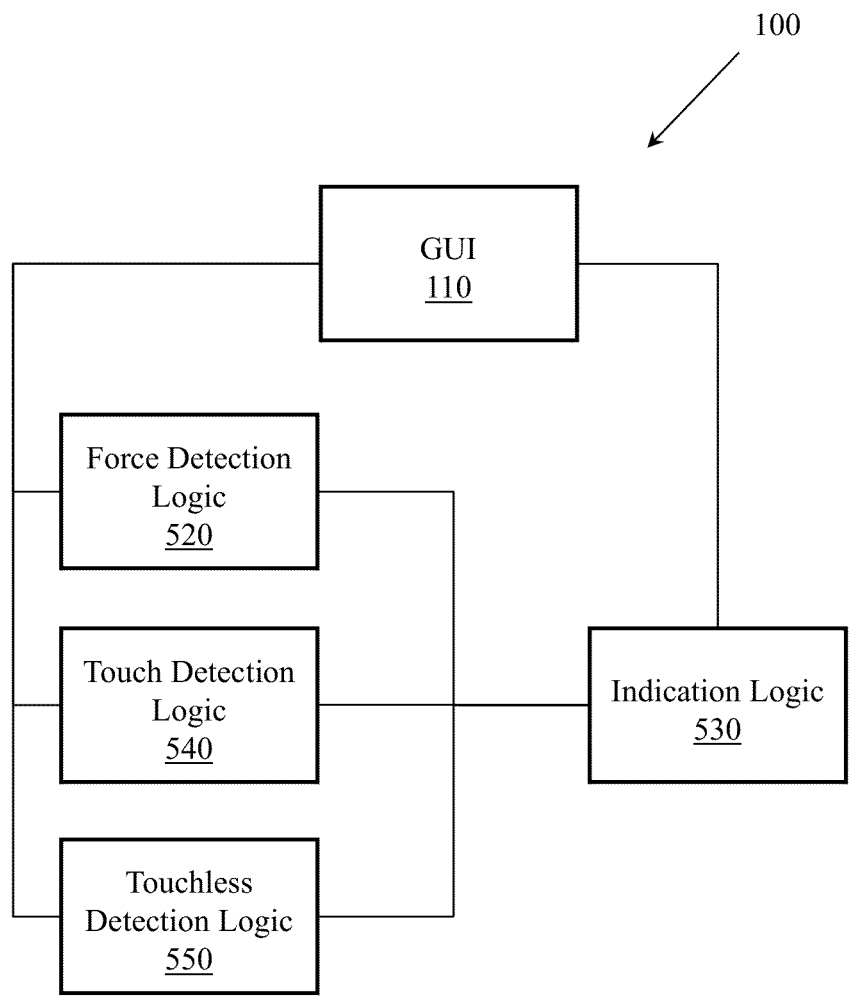
FIG. 5A illustrates a simplified block diagram of an exemplary electronic device including a graphical user interface (GUI).

FIG. 5A illustrates a simplified block diagram of an exemplary electronic device 100. The electronic device 100 includes a graphical user interface (GUI) 110. The GUI 110 receives user input by user exertion of force onto the GUI 110. Such graphical user interface GUI 110 may be implemented by using techniques such as that discussed below in reference to FIGS. 5 to 8. Such touch screen graphical user interface may also be implemented by using other techniques for graphical user interfaces capable of receiving user input by user exertion of force. The GUI 110 may be a graphical user interface that receives user input only by user exertion of force or the GUI 110 may be a graphical user interface that receives user input by user exertion of force onto the GUI 110 in addition to receiving user input by other methods including capacitive sensing or touchless sensing.

In one embodiment, the GUI 110 provides a graphical indication to the user of the electronic device 100 that touching or exerting force at a location on the GUI 110 corresponds to user input commanding the device to perform an action.

The electronic device 100 further includes a force detection logic 520, which produces a signal including data indicative of a first amount of force exerted at the location on the GUI 110. In one embodiment, the GUI 110 and the force detection logic 520 are components of a liquid crystal display (LCD), light emitting diode (LED), or some other type of display assembly. In another embodiment, the force detection logic 520 is independent of a display assembly. In yet another embodiment, the force detection logic 520 is implemented with some portions of the force detection logic 520 as part of a display assembly and other portions of the force detection logic 520 independent of the display assembly.

In one embodiment, upon detection of the first amount of force, the GUI 110 displays a graphical indication that the first amount of force has been detected. For example, the GUI 110 may display a geometric figure that changes in correspondence to changes in force exerted onto the GUI 110. The changing geometric figure displayed by the GUI 110 serves as visual feedback. In one embodiment, the geometric figure becomes larger or smaller in at least one dimension in correspondence to more or less force, respectively, being exerted onto the GUI 110. In another embodiment, upon detection of the first amount of force, the GUI 110 displays a color that changes in correspondence to changes in force exerted onto the GUI 110. The changing color displayed by the GUI 110 serves as visual feedback. In one embodiment, the color changing in correspondence to changes in force exerted onto the graphical user interface includes the color gradually changing to a second color in correspondence to additional force being exerted and gradually returning to the original color in correspondence to less force being exerted.

In another embodiment, the electronic device 100 includes a transducer (not shown) that produces auditory feedback instead of visual feedback. In this embodiment, the electronic device 100 may include a speaker (not shown) that produces a sound. In one embodiment, the auditory feedback includes changing frequency or intensity of the sound as the force exerted on the GUI 110 increases or decreases. In another embodiment, the electronic device 100 includes a transducer (not shown) that produces tactile (e.g., haptic) feedback instead of visual or auditory feedback. In this embodiment, the electronic device 100 may include a vibrator (not shown) that produces vibration. In one embodiment, the tactile feedback includes changing frequency or intensity of the vibration as the force exerted on the GUI 110 increases or decreases. In yet another embodiment, the electronic device 100 provides a feedback by a mechanism other than visual, auditory, or tactile that changes as the force exerted on the GUI 110 increases or decreases. In one embodiment, the electronic device 100 includes a combination of visual, auditory, tactile, or other forms of feedback.

The electronic device 100 further includes an indication logic 530 that receives from the force detection logic 520 the signal including data indicative of the first amount of force. The indication logic 530 determines based on the signal whether the first amount of force is sufficient to command the device to perform the action. The indication logic 530 compares the first amount of force with a threshold minimum amount of force required for the electronic device 100 to perform the action. In one embodiment, the threshold minimum amount of force required for the electronic device 100 to perform the action is a fixed quantity (e.g., 3N). In another embodiment, the threshold minimum amount of force required for the electronic device 100 to perform the action is a quantity that is programmable by a user of the electronic device 100.

If the indication logic 530 determines that the first amount of force is insufficient to command the electronic device to perform the action (i.e., the first amount of force is lower than the threshold minimum amount), the indication logic produces a signal including data indicating that additional force must be exerted to command the electronic device 100 to perform the action. In one embodiment, the GUI 110 displays a graphical indication in response to the signal including data indicating that additional force must be exerted to command the device to perform the action. The graphical indication provides visual feedback to the user that additional force must be exerted to command the device to perform the action. In another embodiment, the electronic device 100 employs some other type of feedback (auditory, tactile, etc.), as discussed above, instead of or in combination with the visual feedback provided by the GUI 110.

In response to this feedback, the user may exert a second amount of force larger than the first amount of force onto the location on the GUI 110. The force detection logic 520 produces a signal including data indicative of the second amount of force. The indication logic 530 determines based on the signal whether the second amount of force is sufficient to command the electronic device 100 to perform the action. If the indication logic 530 determines that the second amount of force is sufficient to command the electronic device 100 to perform the action, the indication logic 530 produces a signal including data commanding performance of the action. In one embodiment, the electronic device 100 provides feedback to the user that the second amount of force has been determined to be sufficient to perform the action. The feedback may be visual (e.g., flashing of the geometric figure on the GUI 110), auditory (e.g., a sound or voice), tactile (a thump or vibration), or some other type of feedback or combinations of feedback.

Although for ease of explanation the present disclosure refers to the amount of force exerted in discrete terms (i.e., a first and a second amount of force), the amount of force exerted by the user on the GUI 110 would usually be a continuous force that increases or decreases as the user presses harder or softer, respectively, on to the GUI 110. Thus, the terms a first amount of force and a second amount of force may be conceptualized as iterations of force detection or measurements of force by the force detection logic 520 or the indication logic 530 where a the first amount of force corresponds to an iteration of force detection or measurement of force exerted and the second amount of force corresponds to a subsequent iteration of detection or measurement of force exerted.

The electronic device 100 may further include a touch detection logic 540. The touch detection logic 540 detects touch of a user's skin on the GUI 110 (e.g., by capacitive sensing) and produces a signal including data indicative of the detected touch.

In one embodiment, the indication logic 530 determines based on the signal from the touch detection logic 540 including data indicative of the detected touch that the detected touch alone is sufficient to command the device 100 to perform the action. So for example, if a user touches the GUI 110 with her bare hands, the touch detection logic 540 detects the touch of the user's skin on the GUI 110, and the indication logic 530 determines that the detected touch is sufficient to command the device 100 to perform the action. However, if the user touched the GUI 110 with gloves on, for example, the touch detection logic 540, which is capacitive sensing based, would not detect the user's touch because the user's skin is covered by the glove. In this instance, the indication logic 530 makes determinations regarding performance of the action based on force detected from the force detection logic 520.

In another embodiment, the indication logic 530 determines based on a combination of the signal from the force detection logic 520 including data indicative of the first amount of force and the signal from the touch detection logic 540 including data indicative of the detected touch that the first amount of force is insufficient to command the device to perform the action. Similarly, the indication logic 530 determines based on a combination of the signal force detection logic 520 including data indicative of the second amount of force and the signal from the touch detection logic 540 including data indicative of the detected touch that the second amount of force is sufficient to command the device to perform the action. Therefore, in this embodiment, detected force alone or detected skin touch alone would not be sufficient to command the device 100 to perform the action; a certain amount of force exerted onto the GUI 110 is necessary, in combination with the detected skin touch, to command the device 100 to perform the action. This should reduce the chances of inadvertent or accidental dialing.

The electronic device 100 may include a touchless detection logic 550 that detects a touchless user input corresponding to a selection of a location on the graphical user interface and produces a signal including data indicative of the touchless user input.

In one embodiment, the indication logic 530 determines based on a combination of the signal from the touchless detection logic 550 including data indicative of the touchless user input and a signal from the force detection logic 520 (e.g., the signal including data indicative of the first amount of force and the signal including data indicative of the second amount of force) that the combination is sufficient by itself to command the device to perform the action. So for example, if a user touches a location on the GUI 110, the touchless detection logic 550 detects the touchless user input and the force detection logic 520 detects some amount of force exerted onto the GUI 110. In this embodiment, the indication logic 530 determines that the detected combination of touchless user input and exerted force is sufficient by itself to command the device 100 to perform the action.

In another embodiment, the indication logic 530 determines based on a combination of the signal from the force detection logic 520 including data indicative of the first amount of force and the signal from the touchless detection logic 550 including data indicative of the detected touchless user input that the first amount of force is insufficient to command the device to perform the action. Similarly, the indication logic 530 determines based on a combination of the signal force detection logic 520 including data indicative of the second amount of force and the signal from the touchless detection logic 550 including data indicative of the detected touchless user input that the second amount of force is sufficient to command the device to perform the action. Thus, in this embodiment, the combination of touchless user input and exerted force alone would not be sufficient to command the device 100 to perform the action; a certain amount of force exerted onto the GUI 110 is necessary, in combination with the touchless user input, to command the device 100 to perform the action.

Figure 5B:
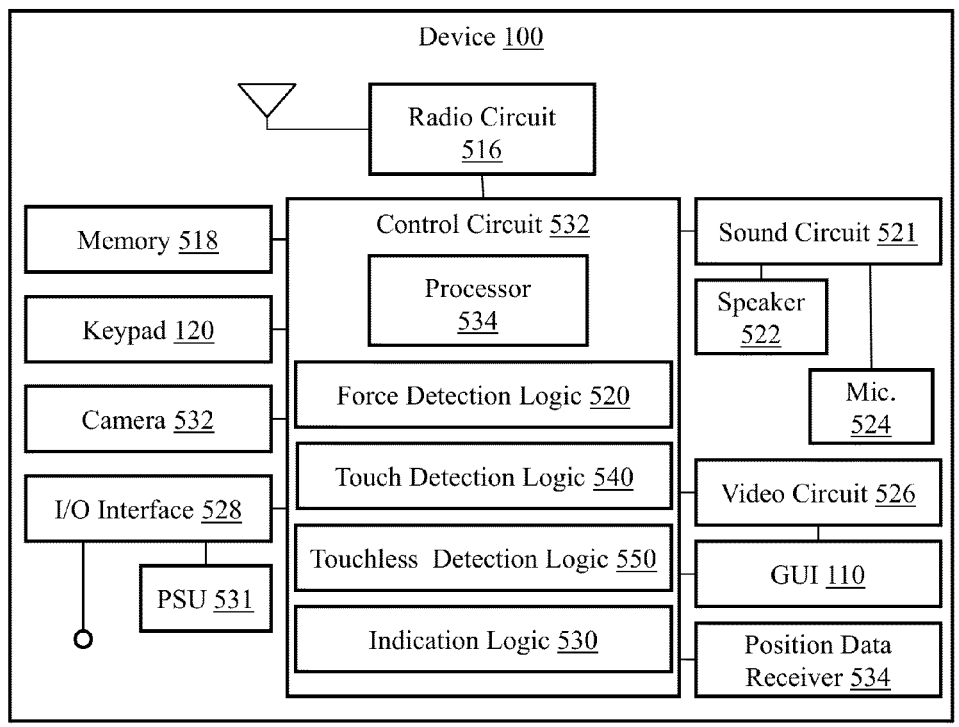
FIG. 5B illustrates a detailed block diagram of an exemplary electronic device including a graphical user interface (GUI).

FIG. 5B illustrates a detailed block diagram of an exemplary electronic device 100. The electronic device 100 includes a control circuit 532 that is responsible for overall operation of the electronic device 100. For this purpose, the control circuit 532 includes a processor 534 that executes various applications, including applications related to or that form part of the force detection logic 520, the indication logic 530, the touch detection logic 540, or the touchless detection logic 550.

In one embodiment, the force detection logic 520, the indication logic 530, the touch detection logic 540, or the touchless detection logic 550 is embodied in the form of executable logic (e.g., lines of code, software, or a program) that is stored on a non-transitory computer readable medium (e.g., a memory, a hard drive, etc.) of the electronic device 100 and is executed by the control circuit 532. The described operations may be thought of as a method that is carried out by the electronic device 100. Variations to the illustrated and described techniques are possible and, therefore, the disclosed embodiments should not be considered the only manner of carrying out electronic device 100 functions. Also, while the appended figures show exemplary displayed visual content, the content may be different than that shown.

The electronic device 100 further includes the GUI 110, which has been described in detail in reference to FIGS. 1-5A. The GUI 110 may be coupled to the control circuit 532 by a video circuit 526 that converts video data to a video signal used to drive the GUI 110. The video circuit 526 may include any appropriate buffers, decoders, video data processors and so forth.

The electronic device 100 further includes communications circuitry that enables the electronic device 100 to establish communication connections such as the telephone call described above. In the exemplary embodiment, the communications circuitry includes a radio circuit 516. The radio circuit 516 includes one or more radio frequency transceivers and an antenna assembly (or assemblies). Since the electronic device 100 is capable of communicating using more than one standard, the radio circuit 516 represents each radio transceiver and antenna needed for the various supported connection types. The radio circuit 516 further represents any radio transceivers and antennas used for local wireless communications directly with an electronic device, such as over a Bluetooth interface.

As indicated, the electronic device 100 includes the primary control circuit 532 that is configured to carry out overall control of the functions and operations of the electronic device 100. The processor 534 of the control circuit 532 may be a central processing unit (CPU), microcontroller or microprocessor. The processor 534 executes code stored in a memory (not shown) within the control circuit 532 and/or in a separate memory, such as a memory 518, in order to carry out operation of the electronic device 100. The memory 518 may be, for example, one or more of a buffer, a flash memory, a hard drive, a removable media, a volatile memory, a non-volatile memory, a random access memory (RAM), or other suitable device. In a typical arrangement, the memory 518 includes a non-volatile memory for long term data storage and a volatile memory that functions as system memory for the control circuit 532. The memory 518 may exchange data with the control circuit 532 over a data bus. Accompanying control lines and an address bus between the memory 518 and the control circuit 532 also may be present. The memory 518 is considered a non-transitory computer readable medium.

The electronic device 100 may further include a sound circuit 521 for processing audio signals. The sound circuit 521 may be incorporated by or work in conjunction with the indication logic 530 to provide auditory feedback to a user of the device 100. Coupled to the sound circuit 521 are a speaker 522 and a microphone 524 that enable a user to listen and speak via the electronic device 100, and hear sounds generated in connection with other functions of the device 100. The sound circuit 521 may include any appropriate buffers, encoders, decoders, amplifiers and so forth.

The electronic device 100 may further include the keypad 120 that provides for a variety of user input operations as described above in reference to FIG. 1. The electronic device 100 may further include one or more input/output (I/O) interface(s) 528. The I/O interface(s) 528 may be in the form of typical electronic device I/O interfaces and may include one or more electrical connectors for operatively connecting the electronic device 100 to another device (e.g., a computer) or an accessory (e.g., a personal handsfree (PHF) device) via a cable. Further, operating power may be received over the I/O interface(s) 528 and power to charge a battery of a power supply unit (PSU) 531 within the electronic device 100 may be received over the I/O interface(s) 528. The PSU 531 may supply power to operate the electronic device 100 in the absence of an external power source.

The electronic device 100 also may include various other components. For instance, a camera 532 may be present for taking digital pictures and/or movies. Image and/or video files corresponding to the pictures and/or movies may be stored in the memory 518. As another example, a position data receiver 534, such as a global positioning system (GPS) receiver, may be present to assist in determining the location of the electronic device 100.

Figure 6:
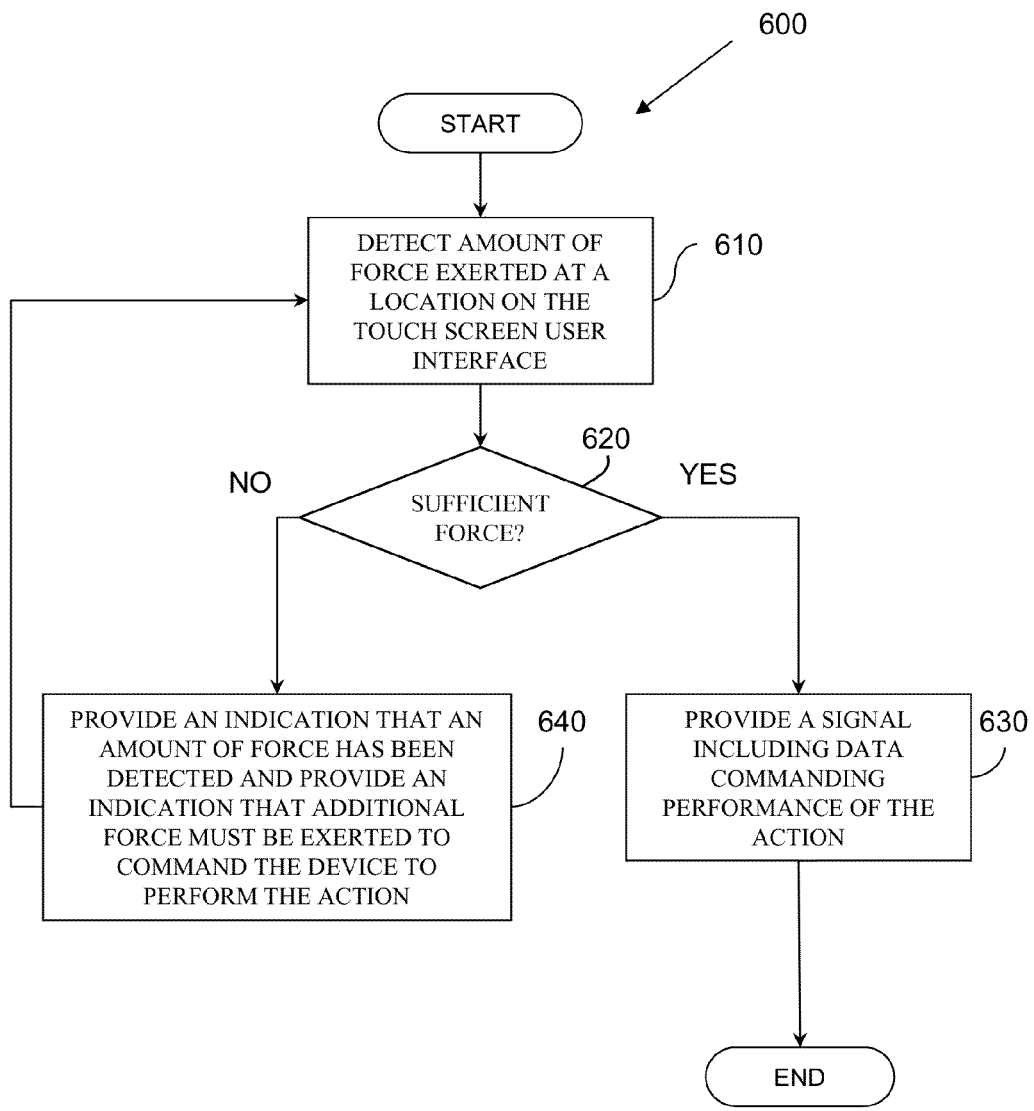
FIG. 6 is a flowchart that illustrates logical operations to implement an exemplary method for a device including a touch screen user interface to receive a user input commanding the device to perform an action.
Figure 7:
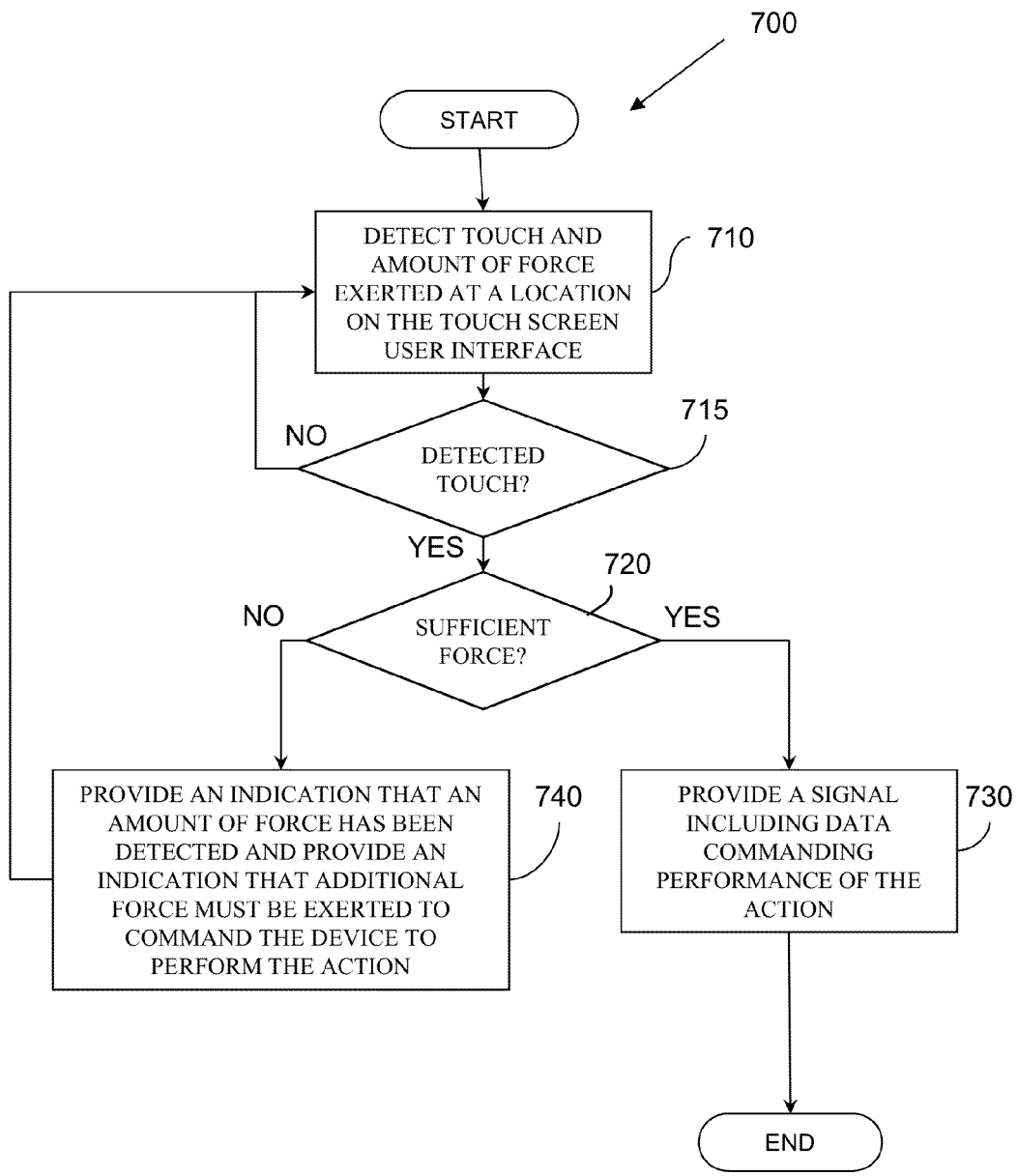
FIG. 7 is a flowchart that illustrates logical operations to implement an exemplary method for another device including a touch screen user interface to receive a user input commanding the device to perform an action.
Figure 8:
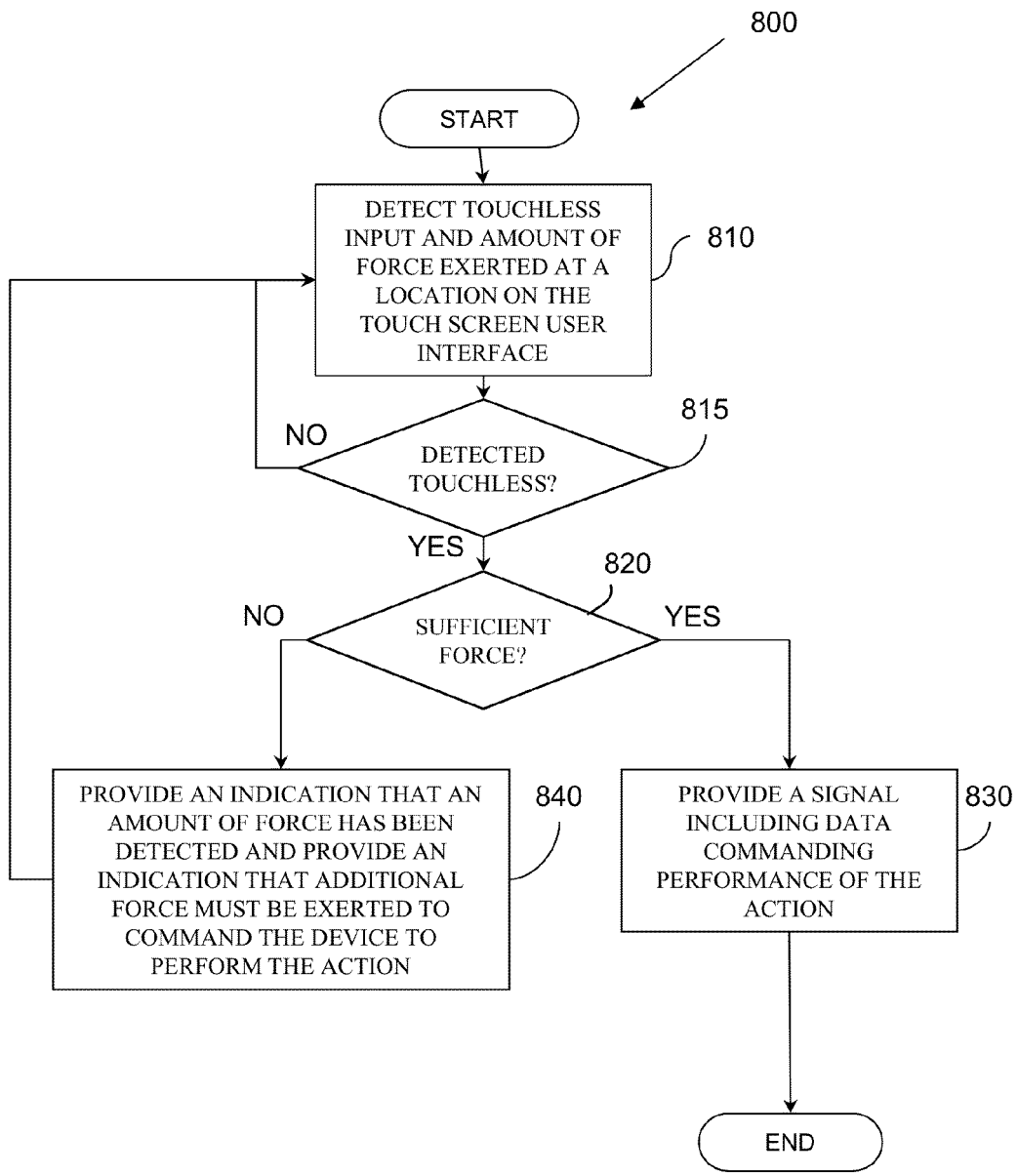
FIG. 8 is a flowchart that illustrates logical operations to implement an exemplary method for another device including a touch screen user interface to receive a user input commanding the device to perform an action.

Referring now to FIGS. 6-8, flowcharts are shown that illustrate logical operations to implement exemplary methods for a device including a touch screen user interface to receive a user input commanding the device to perform an action. The exemplary methods may be carried out by executing embodiments of the mobile telephones or electronic devices disclosed herein, for example. Thus, the flowcharts of FIGS. 6-8 may be thought of as depicting steps of methods carried out in the above-disclosed mobile telephones or electronic devices by operation of hardware, software, or combinations thereof. Although FIGS. 6-8 show a specific order of executing functional logic blocks, the order of executing the blocks may be changed relative to the order shown. Also, two or more blocks shown in succession may be executed concurrently or with partial concurrence. Certain blocks also may be omitted.

In reference to FIG. 6, logical flow of a method 600 for receiving a user input commanding the device to perform the action may begin at 610 by detecting a first amount of force exerted at a location on the touch screen user interface. In one embodiment, prior to detecting the first amount of force exerted at the location on the touch screen user interface, the method 600 includes providing a graphical indication at the location on the touch screen user interface that touching or exerting force at the location on the graphical user interface corresponds to user input commanding the device to perform the action.

At 620, the method 600 determines whether the first amount of force detected is sufficient force to command the device to perform the action. If the first amount of force detected is sufficient to command the device to perform the action, at 630, the method 600 provides a signal including data commanding performance of the action.

However, if the first amount of force detected is insufficient to command the device to perform the action the method 600, at 640, provides an indication that the first amount of force has been detected and further provides an indication that additional force must be exerted to command the device to perform the action. The method 600 returns to 610 to detect a second amount of force exerted at a location on the touch screen user interface. As described above, at 620, the method 600 determines whether the second amount of force detected is sufficient force to command the device to perform the action. If the second amount of force detected is sufficient to command the device to perform the action, at 630, the method 600 provides a signal including data commanding performance of the action. If the second amount of force detected is insufficient to command the device to perform the action the method 600, at 640, provides an indication that the second amount of force has been detected and further provides an indication that additional force must be exerted to command the device to perform the action and returns to 610.

In one embodiment, the method 600 includes giving feedback to a user of the device. For example, the indication that the first amount of force has been detected, the indication that additional force must be exerted to command the device to perform the action, the indication that the second amount of force has been detected, or the indication indicating the second amount of force to be sufficient to command the device to perform the action may include a sound feedback, a haptic feedback, a graphical feedback, another type of feedback, or combinations thereof.

In one embodiment, providing the indication that additional force must be exerted to command the device to perform the action includes displaying on the touch screen user interface a geometric figure or a color that changes in correspondence with changes in the force exerted. In one embodiment, displaying on the touch screen user interface the geometric figure or the color includes the geometric figure or the color changing (e.g., geometric figure growing in at least one dimension, color changing to a different color) in correspondence with additional force being exerted and changing again (e.g., geometric figure shrinking it at least one dimension, color changing back to the original color) in correspondence with less force being exerted. In another embodiment, providing the indication that additional force must be exerted to command the device to perform the action includes providing a sound signal or a vibration signal. The frequency or intensity of the sound signal or the vibration signal changes as force exerted on the user interface changes.

In one embodiment (not shown), the method 600 includes detecting touch of a user's skin at substantially the location on the touch screen user interface, and providing the signal including data commanding performance of the action based on the detecting touch of the user's skin at substantially the location on the touch screen user interface. Thus, in this embodiment, detected skin touch alone would be sufficient to command performance of the action.

In reference to FIG. 7, logical flow of a method 700 for receiving a user input commanding the device to perform the action may begin at 710 by detecting a first amount of force exerted at a location on the touch screen user interface and touch of a user's skin at substantially the location on the touch screen user interface. At 715, the method 700 determines whether the location on the touch screen user interface was touched. If the location on the touch screen user interface was not touched then return to detecting touch and force at 710. If the location on the touch screen user interface was touched, at 720, the method 700 determines whether the first amount of force detected is sufficient force to command the device to perform the action. If the first amount of force detected is sufficient to command the device to perform the action, at 730, the method 700 provides a signal including data commanding performance of the action.

However, if the first amount of force detected is insufficient to command the device to perform the action the method 700, at 740, provides an indication that the first amount of force has been detected and further provides an indication that additional force must be exerted to command the device to perform the action. The method 700 returns to 710 to detect touch and a second amount of force exerted at a location on the touch screen user interface. As described above, at 720, the method 700 determines whether the second amount of force detected is sufficient force to command the device to perform the action. If the second amount of force detected is sufficient to command the device to perform the action, at 730, the method 700 provides a signal including data commanding performance of the action. If the second amount of force detected is insufficient to command the device to perform the action the method 700, at 740, provides an indication that the second amount of force has been detected and further provides an indication that additional force must be exerted to command the device to perform the action and returns to 710.

Thus, in this embodiment, detected force alone or detected skin touch alone would not be sufficient to command performance of the action; a certain amount of exerted force is necessary, in combination with the skin touch input, to command performance of the action.

In reference to FIG. 8, logical flow of a method 800 for receiving a user input commanding the device to perform the action may begin at 810 by detecting a first amount of force exerted at a location on the touch screen user interface and a touchless user input corresponding to a selection of the location on the graphical user interface. At 815, the method 800 determines whether the touchless user input corresponding to a selection of the location on the graphical user interface was received. If the touchless user input corresponding to a selection of the location on the graphical user interface was not received then return to detecting touchless user input and force at 810. If the touchless user input corresponding to a selection of the location on the graphical user interface was received, at 820, the method 800 determines whether the first amount of force detected is sufficient force to command the device to perform the action. If the first amount of force detected is sufficient to command the device to perform the action, at 830, the method 800 provides a signal including data commanding performance of the action.

However, if the first amount of force detected is insufficient to command the device to perform the action the method 800, at 840, provides an indication that the first amount of force has been detected and further provides an indication that additional force must be exerted to command the device to perform the action. The method 800 returns to 810 to detect the touchless user input and a second amount of force exerted at a location on the touch screen user interface. As described above, at 820, the method 800 determines whether the second amount of force detected is sufficient force to command the device to perform the action. If the second amount of force detected is sufficient to command the device to perform the action, at 830, the method 800 provides a signal including data commanding performance of the action. If the second amount of force detected is insufficient to command the device to perform the action the method 800, at 840, provides an indication that the second amount of force has been detected and further provides an indication that additional force must be exerted to command the device to perform the action and returns to 810.

Thus, the method 800 includes detecting a touchless user input corresponding to a selection of the location on the graphical user interface and providing the signal including data commanding performance of the action based on a combination of the detecting the touchless user input corresponding to the selection of the location on the graphical user interface and at least one of the detecting the first amount of force exerted at the location on the touch screen user interface and the detecting the second amount of force larger than the first amount of force exerted substantially at the location. In one embodiment, the combination of detected touchless user input and detected exerted force is sufficient by itself to command performance of the action. In another embodiment, the combination of touchless user input and exerted force alone would not be sufficient to command performance of the action; a certain amount of force exerted onto the interface is necessary, in combination with the touchless user input, to command performance of the action.

Figure 9:
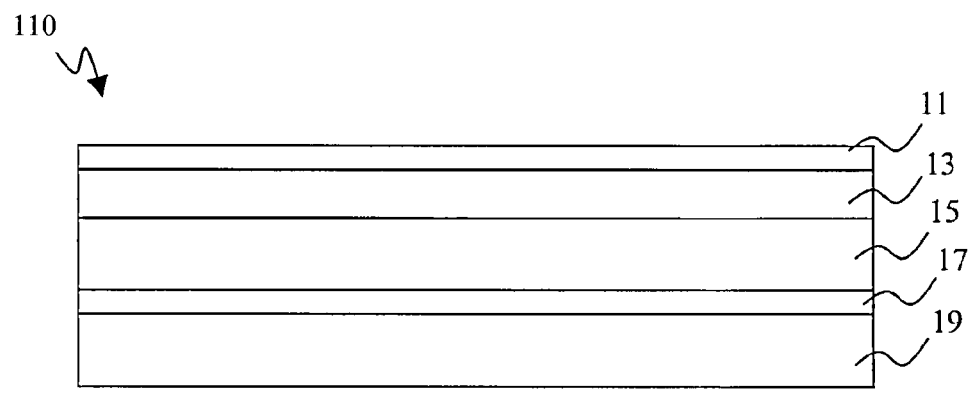
FIG. 9 shows a schematic cross section of a piezoelectric input device.

As described above, in one embodiment, the GUI 110 of FIG. 1 is a touch screen graphical user interface that is force sensing; the GUI 110 receives user input by user exertion of force onto the GUI 110. With reference to FIG. 9, a schematic and cross sectional view of a GUI 110 is shown that may be used with the devices or phone 100 of the present application. The GUI 110 is a piezoelectric touch panel that has a multi-layered structure. The piezoelectric touch panel comprises a first hard coat layer 11 applied on a first conductive layer 13, wherein the hard coat layer 11 functions as a protective/isolating coating of the first conductive layer. The piezoelectric touch panel further comprises a second conductive layer 17 arranged below the first conductive layer 13 on a carrier material 19, such as glass, plastic or the like. In an embodiment is carrier 19 an active display of a device. In between the first conductive layer 13 and the second conductive layer 17 a piezoelectric material layer 15 is arranged.

A piezoelectric material is a polarized material that converts mechanical deformation of its crystals into an electrical charge. The material may be polarized in a vertical manner or a lateral manner. The vertically polarized material generates a charge that is higher than the laterally polarized material when being compressed vertically which may be desired in order to make it easier to detect the input from a user. The charge developed may then be converted to a voltage. A greater deformation will result in a higher charge and consequently a higher voltage. That is;

$Q = p \times F$, wherein

Q=Resulting Charge
p=piezoelectric coefficient of the material
F=force on the material layer And the generated voltage is;

$V = Q/C$, wherein

V=Voltage, and
C=Total Capacitance over the layer

It should be noted that in an embodiment a number of piezoelectric material layers are stacked in order to generate a higher voltage and a wider span of voltage.

Icons, text, symbols or the like of the user interface may be presented to the user on the hard coat layer 11, wherein the icon and the like are printed on the hard coat layer or, in an portable device wherein positions of menus or functions and the like, for example, of the touch panel, may change during use, the different icons, symbols or the like, is displayed from an active display arranged below the touch panel. An embodiment of an electronic device may also comprise a combination of an illuminating arrangement from below and printed symbols on the hard coat layer 11.

The hard coat layer 11 may be a yieldable, yet hard material such as plastic, PET or the like, in order to flex during depression and still protect the input de-vice/electronic device from its surroundings.

The conductive layers 13, 17 may be Indium Tin Oxide (ITO) layers or layers of any other conductive material. It should here be noted in the embodiment wherein a display is arranged below the touch panel the conductive layers need to be transparent in order to be able to present the display as in the example of ITO. This in its turn requires the layers to be very thin. In an embodiment wherein the symbols or the like are displayed by means of the coat layer the conductive layers may be opaque.

The conductive layers may, for example, be vaporized into the piezoelectric material, heated and then melted onto conductive layers, etched to the piezoelectric material or arranged to each other omitting an air gap between the layers by any other known method. The different layers may also be arranged to each other by glue, adhesive or the like.

The layers may be arranged in a frame arranged on the electronic device, wherein the frame structure accommodates the touch panel. However, in another embodiment the touch panel is arranged flat onto the display, as an alternative of protective glass/plastic of displays, forming a flat design of the device.

The piezoelectric material 15 may be Lead zirconate titanate (Pb(ZrTi)O3), Strontium titanate (SrTiO3), Potassium niobate (KNO3), Lithium niobate (LiNbO3), Lithium tantalate (LiTaO3), Bismuth ferrite (BiFeO3), Sodium tungstate (NaxWO3), Ba2NaNb5O5, Pb2KNb5O15, Quartz, Tourmaline, Topaz, cane sugar, Rochelle salt, Berlinite (AlPO4)—a quartz analogue crystal, Gallium orthophosphate (GaPO4)—a quartz analogue crystal, Langasite (La3Ga5SiO14)—a quartz analogue crystal, the family of ceramics with perovskite or tungsten-bronze structures, Barium titanate (BaTiO3), Polyvinylidene fluoride (PVDF) or the like. The material may be transparent or opaque and may approximately have a thickness of 10 μm.

Figure 10:
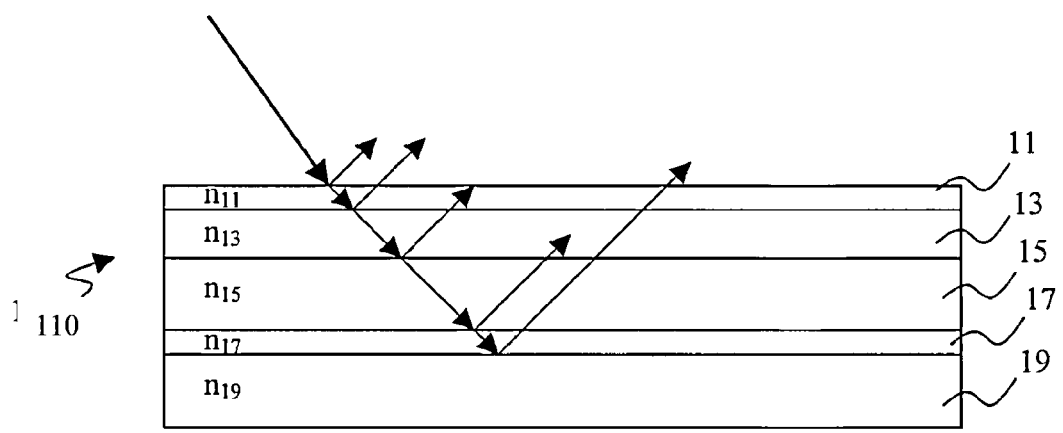
FIG. 10 shows a schematic overview of how light reflects in a piezoelectric input device.

Referring to FIG. 10, in an embodiment the piezoelectric material of the piezoelectric material layer 15 is selected in order to provide an input device that is clear and has a high contrast in bright sunshine with a minimum of reflections. In this embodiment the piezoelectric material is selected so that the refractive index $n_{15}$ of the piezoelectric material is matched to the refractive index $n_{13}$, $n_{17}$ of the conductive layers 13, 17 and hence, an input device is provided with small reflections. The refractive index (or index of refraction) of a medium is a measure for how much the speed of light is reduced inside the medium. The refractive index n of a medium is defined as the ratio of the phase velocity c of a light/sound wave phenomenon in a reference medium to the phase velocity $v_{ph}$ in the medium itself:

$$n=c/v_{ph}$$

A display under the input device, such as a touch panel, in this embodiment will look clear and have a high contrast in bright sunshine.

Figure 11:
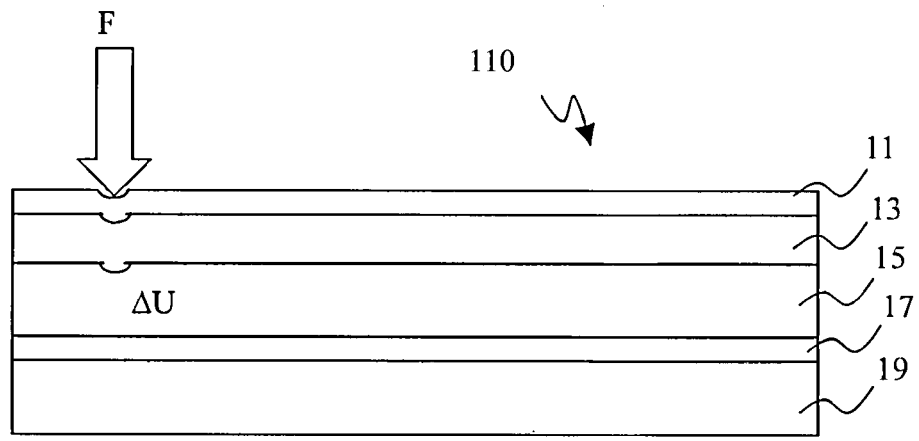
FIG. 11 shows a schematic cross section of a piezoelectric input device being depressed.

Referring to FIG. 11, when a pressure F is applied at a certain location of the input device 10 the coat layer 11 and the first conductive layer 13 is deformed so that a pressure also will be applied on the piezoelectric material layer 15. The piezoelectric layer 15 is thereby deformed so that it generates a voltage ΔU. The greater the force applied by the user, the greater the voltage generated. Hence, a piezoelectric touch panel generates its own voltage and does not need additional power sources to determine position of input. The hard coat layer 10 need to approximately deform 0.1 mm in order to get an input registered, as opposed to resistive touch panels that need a deformation of 1 mm. Hence, a piezoelectric touch panel may be relatively compact enabling, for example, the hard coat layer to be thicker and thereby more durable and/or the portable device to be thinner.

It should be noted that an embodiment that is very sensitive to the touch input may require a key-lock feature. The input registration of the input device may also be tuned in to different levels of input force. Other ways of operating a sensitive touch input device may be by using a double finger input, i.e. using two-finger touch during the input, and/or an initiating hard input registration followed by a soft selection input or the like.

Figure 12:
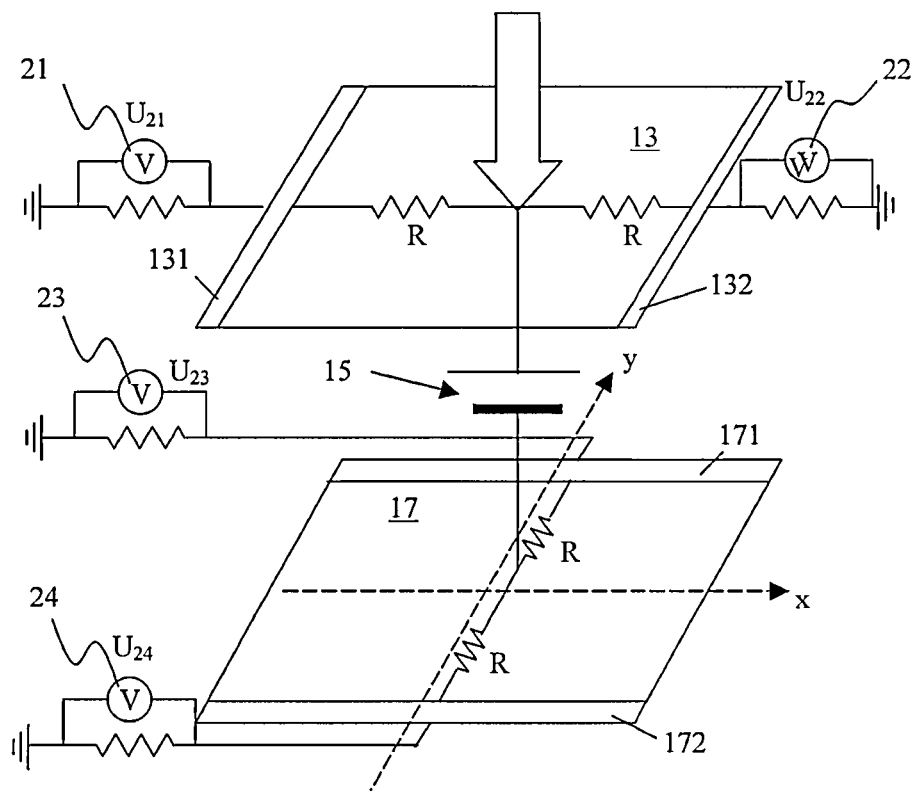
FIG. 12 shows an electrical functionality of a piezoelectric material touch panel.

In FIG. 12, an electrical functionality of an embodiment of a piezoelectric touch panel is shown. The piezoelectric touch panel comprises a first conductive layer 13, a second conductive layer 17 and a piezoelectric material 15 indicated as a voltage supply. The piezoelectric material layer generates a voltage ΔU when being compressed as in the case of applied pressure the touch panel. The voltage is measured by a number of measuring devices 21-24 for measuring an electrical potential difference between two points in an electric circuit, such as a voltmeter or the like. A resistance in the conductive layer is denoted as resistors R in the figure. As the resistance changes over the conductive layer the difference between a first voltmeter 21 and a second voltmeter 22 indicates a position in, for example, x direction, wherein a higher voltage reading indicates that the position is closer to that voltmeter. In a similar manner the y position is determined by comparing the readings of a third voltmeter 23 and a fourth voltmeter 24.

It should be noted that the measuring devices may be arranged inside the device and conductors, denoted as 131, 132, 171, 172, of the conductive layers may be hidden under a coating of a graphic film applied onto the top layer or the conductive layer.

In FIG. 12 a coordinate system has been added. In order to determine the position of the input in the coordinate system a voltage relation may be used wherein $U_{22}/U_{21}>1$ is a position on the positive side of the x-axis, $U_{22}/U_{21}=1$ is a position along the center of the coordinate system in the x direction, and $U_{22}/U_{21}<1$ is a position on the negative side of the x-axis. In a similar manner, $U_{24}/U_{23}>1$ is a position on the positive side of the y-axis, $U_{24}/U_{23}=1$ is a position along the center of the coordinate system in the y direction, and $U_{24}/U_{23}<1$ is a position on the negative side of the y-axis. Any other method of detecting positioning of a generated voltage may be used.

In an embodiment the first conductive layer may be connected to ground, wherein the conductive layer also protects the panel from electrostatic discharge (ESD). However, in another embodiment the second conductive layer may be connected to ground. When determining the position the measuring arrangement may first measure the voltages in one direction and, with a small delay, for example, 1 ms, measure voltages in the other direction. It should also be noted that the conductive layers may alternately be connected to ground.

It is, furthermore, possible to determine how hard the user presses down the position of the input device based on the readings. In an embodiment arranged to determine how hard a user presses down the touch panel, a first predetermined threshold value is set as a start-up voltage value to detect that the touch panel is actually touched. The way of determining how hard the touch screen is pressed may be determined by setting up different threshold values above the first predetermined threshold value indicating different actions when reached. Alternatively, the determination on how hard may be based on actual continuous voltage readings. It should here be noted that the thickness of piezoelectric material may increase the span of voltage, such as adding a new layer or the like, and, hence, the possibility to differentiate different pressures to different selected actions. In an embodiment the readings of the different voltmeters in every axis is summarized in order to determine how hard the user has pressed down on the in-put section.

Although certain embodiments have been shown and described, it is understood that equivalents and modifications falling within the scope of the appended claims will occur to others who are skilled in the art upon the reading and understanding of this specification.

"Logic," as used herein, includes but is not limited to hardware, firmware, software or combinations of each to perform a function(s) or an action(s), or to cause a function or action from another logic, method, or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 524 (2d. Ed. 1995).

The invention claimed is:

1. A mobile telephone comprising:
a force detection logic configured to detect a first amount of force exerted on a graphical user interface and further configured to produce a signal including data indicative of the first amount of force; and
an indication logic configured to determine based on the signal including data indicative of the first amount of force that the first amount of force is insufficient to command the mobile telephone to answer the incoming telephone call and further configured to produce a signal indicating that additional force must be exerted to command the mobile telephone to answer the incoming telephone call,
wherein the force detection logic is further configured to detect a second amount of force larger than the first amount of force exerted on the graphical user interface and further configured to produce a signal including data indicative of the second amount of force, and
wherein the indication logic is further configured to determine based on the signal including data indicative of the second amount of force that the second amount of force is sufficient to command the mobile telephone to answer the incoming telephone call.

2. The mobile telephone of claim 1, wherein the graphical user interface is further configured to display a graphical indication corresponding to an indication that force additional to the first amount of force must be exerted on the graphical user interface to command the mobile telephone to answer the incoming telephone call.

3. The mobile telephone of claim 2, wherein the graphical indication includes a graphic that changes in correspondence to changes in force exerted onto the graphical user interface.

4. The mobile telephone of claim 3, wherein the graphic changing in correspondence to changes in force exerted onto the graphical user interface includes at least one of size of the graphic changing in at least one dimension in correspondence to changes in force exerted onto the graphical user interface or color of the graphic changing in correspondence to changes in force exerted onto the graphical user interface.

5. The mobile telephone of claim 1, further comprising:
a transducer configured to produce sound or vibration in response to the signal including data indicating that additional force must be exerted to command the mobile telephone to answer the incoming telephone call, wherein at least one of frequency or intensity of the at least one of the sound or the vibration changes in correspondence to changes in the force exerted onto the graphical user interface.

6. The mobile telephone of claim 1, comprising:
a touch detection logic configured to detect touch of a user's skin on the graphical user interface and further configured to produce a signal including data indicative of the detected touch,
wherein the indication logic is further configured to, based on the signal including data indicative of the detected touch, command the mobile telephone to answer the incoming telephone call.

7. The mobile telephone of claim 1, comprising:
a touch detection logic configured to detect touch of a user's skin on the graphical user interface and further configured to produce a signal including data indicative of the detected touch,
wherein the indication logic is configured to determine based on a combination of the signal including data indicative of the detected touch and the signal including data indicative of the first amount of force that the first amount of force is insufficient to command the mobile telephone to answer the incoming telephone call,
wherein the indication logic is configured to determine based on a combination of the signal including data indicative of the detected touch and the signal including data indicative of the second amount of force that the second amount of force is sufficient to command the mobile telephone to answer the incoming telephone call.

8. The mobile device of claim 1, comprising:
a touchless detection logic configured to detect a touchless user input corresponding to a selection on the graphical user interface and further configured to produce a signal including data indicative of the touchless user input,
wherein the indication logic is configured to, based on a combination of the signal including data indicative of the touchless user input and at least one of the signal including data indicative of the first amount of force or the signal including data indicative of the second amount of force, command the mobile telephone to answer the incoming telephone call.

9. A device comprising:
a force detection logic configured to produce a signal including data indicative of a first amount of force exerted onto a graphical user interface; and
an indication logic configured to determine based on the signal including data indicative of the first amount of force exerted on the graphical user interface that the first amount of force is insufficient to command the device to perform an action;
wherein the force detection logic is further configured to produce a signal including data indicative of a second amount of force larger than the first amount of force exerted onto the graphical user interface, and
wherein the indication logic is further configured to determine based on the signal including data indicative of the second amount of force exerted on the graphical user interface that the second amount of force is sufficient to command the device to perform the action.

10. The device of claim 9, wherein the indication logic is further configured to, upon determining that the first amount of force is insufficient to command the device to perform the action, produce a signal including data indicating that additional force must be exerted to command the device to perform the action.

11. The device of claim 9, wherein the indication logic is further configured to, upon determining that the second amount of force is sufficient to command the device to perform the action, produce at least one of a signal including data indicating that the second amount of force is sufficient to command the device to perform the action and a signal commanding the device to perform the action.

12. The device of claim 9, further comprising:
a transducer configured to produce sound or vibration in response to the signal including data indicating that additional force must be exerted to command the device to perform the action, wherein at least one of frequency or intensity of the at least one of the sound or the vibration changes in correspondence to changes in the force exerted onto the graphical user interface.

13. The device of claim 9, wherein the indication logic is configured to cause the graphical user interface to display a graphical indication that changes in correspondence to changes in the force exerted onto the graphical user interface.

14. The device of claim 9, comprising:
a touch detection logic configured to detect touch of a user's skin on the graphical user interface and further configured to produce a signal including data indicative of the detected touch,
wherein the indication logic is further configured to, based on the signal including data indicative of the detected touch, command the device to perform the action.

15. The device of claim 9, comprising:
a touch detection logic configured to detect touch of a user's skin on the graphical user interface and further configured to produce a signal including data indicative of the detected touch,
wherein the indication logic is configured to determine based on a combination of the signal including data indicative of the detected touch and the signal including data indicative of the first amount of force that the first amount of force is insufficient to command the device to perform the action,
wherein the indication logic is configured to determine based on a combination of the signal including data indicative of the detected touch and the signal including data indicative of the second amount of force that the second amount of force is sufficient to command the device to perform the action.

16. The device of claim 9, comprising:
a touchless detection logic configured to detect a touchless user input corresponding to a selection on the graphical user interface and further configured to produce a signal including data indicative of the touchless user input,
wherein the indication logic is configured to, based on a combination of the signal including data indicative of the touchless user input and at least one of the signal including data indicative of the first amount of force or the signal including data indicative of the second amount of force, command the device to perform the action.

17. A method for a device to receive a user input commanding the device to perform an action, the method comprising:
detecting a first amount of force exerted onto a graphical user interface;
providing an indication that additional force must be exerted onto the graphical user interface to command the device to perform the action;
detecting a second amount of force larger than the first amount of force exerted onto the graphical user interface; and
providing a signal including data commanding performance of the action.

18. The method of claim 17, the method further comprising:
providing an indication that the second amount of force has been detected and further indicating the second amount of force to be sufficient to command the device to perform the action.

19. The method of claim 17, wherein at least one of the indication that the first amount of force has been detected or the indication that additional force must be exerted to command the device to perform the action includes at least one of a sound feedback, a haptic feedback, or a graphical feedback.

20. The method of claim 17 further comprising:
providing a graphical indication on the graphical user interface that at least one of touching or exerting force onto the graphical user interface corresponds to the user input commanding the device to perform the action.

21. The method of claim 17, wherein the providing the indication that additional force must be exerted to command the device to perform the action includes changing a graphical indication in correspondence with changes in the force exerted.

22. The method of claim 21, wherein the changing the graphical indication includes at least one of:
changing the graphical indication in correspondence to additional force or less force being exerted,
increasing the size of a graphic in at least one dimension in correspondence with additional force being exerted and shrinking the size of the graphic in it at least one dimension in correspondence with less force being exerted, or
changing a portion of the graphical user interface or the graphical indication gradually from a first color to a second color in correspondence to additional force being exerted and gradually returning to the first color in correspondence to less force being exerted.

23. The method of claim 17, wherein the providing the indication that additional force must be exerted to command the device to perform the action includes providing at least one of a sound signal or a vibration signal, wherein at least one of frequency or intensity of the at least one of the sound signal or the vibration signal changes as force exerted on the user interface changes.

24. The method of claim 17, comprising:
detecting touch of a user's skin on the graphical user interface; and
providing the signal including data commanding performance of the action based on the detecting touch of the user's skin on the graphical user interface.

25. The method of claim 17, comprising:
detecting touch of a user's skin on the graphical user interface;
providing the indication that the first amount of force has been detected and the indication that additional force must be exerted to command the device to perform the action based on a combination of the detecting the touch of the user's skin on the graphical user interface and the detecting the first amount of force exerted on the graphical user interface; and
providing the signal including data commanding performance of the action based on a combination of the detecting the touch of the user's skin on the graphical user interface and the detecting the second amount of force larger than the first amount of force exerted onto the graphical user interface.

26. The method of claim 17, comprising:
detecting a touchless user input corresponding to a selection on the graphical user interface; and
providing the signal including data commanding performance of the action based on a combination of the detecting the touchless user input corresponding to the selection on the graphical user interface and the detecting the second amount of force larger than the first amount of force exerted onto the graphical user interface.

27. A device comprising:
a graphical user interface configured to receive a user input by user exertion of force onto the graphical user interface;
a force detection logic operatively connected to the graphical user interface and configured to produce a signal including data indicative of an amount of force exerted on the graphical user interface;
a touchless detection logic configured to detect a touchless user input corresponding to a selection on the graphical user interface and further configured to produce a signal including data indicative of the touchless user input; and an indication logic operatively connected to the force detection logic and the touchless detection logic, the indication logic configured to command the performance of an action based on a combination of the signal including data indicative of the amount of force exerted and the signal including data indicative of the touchless user input.

28. The device of claim 27, wherein the indication logic is configured to command the performance of the action if the signal including data indicative of the amount of force exerted indicates that an amount of force larger than a threshold has been exerted on the graphical user interface and the signal including data indicative of the touchless user input indicates that the selection on the graphical user interface has been selected.

29. The device of claim 27, wherein the indication logic is configured to take no action if the signal including data indicative of the touchless user input indicates that the selection on the graphical user interface has been selected but the signal including data indicative of the amount of force exerted indicates that an amount of force larger than a threshold has not been exerted on the graphical user interface.

30. The device of claim 27, wherein the indication logic is configured to produce a signal indicative of hovering if the signal including data indicative of the touchless user input indicates that the selection on the graphical user interface has been selected but the signal including data indicative of the amount of force exerted indicates that an amount of force larger than a threshold has not been exerted on the graphical user interface.

* * * * *